Patented Oct. 5, 1943

2,331,022

UNITED STATES PATENT OFFICE 2,331,022

BITUMINOUS EMULSION AND METHOD FOR PRODUCING THE SAME

Ross J. Garofalo, Los Angeles, and Frederick S. Scott, Beverly Hills, Calif., assignors to Union Oil Company of California, Los Angeles, Calif., a corporation of California No Drawing. Application December 11, 1939, Serial No. 308,574

4 Claims. (Cl. 252—311.5)

The present invention relates to improved oil-in-water type emulsions of bitumen such as asphalt, pitch, tar and tar-like substances, resins and other bituminous substances of natural or artificial origin and to a process for the manufacture of the same. Such emulsions are suitably employed as binders, adhesives and coating compositions and are more particularly employed in road building to bind mineral aggregate.

The invention is particularly concerned with the manufacture of so-called "quick breaking" emulsions which may be used in building roads by the "penetration" method which consists essentially in spraying, pouring or pumping the bituminous emulsions upon the mineral aggregate previously placed upon the road bed. These emulsions break rapidly upon contact with the aggregate liberating the water and permitting the asphalt to bind the aggregate. It is one of the necessary characteristics of a quick breaking emulsion that it possess the property to break rapidly when applied to the aggregate on the road bed. One of the tests which is commonly used to determine this property of quick breaking is the so-called "demulsibility" test described in A. S. T. M. Method D244—39 which consists in mixing 100 parts of the emulsion with 35 parts of 0.02% normal calcium chloride and determining the percentage of asphalt broken out from the emulsion. Thus, an emulsion having a demulsibility of 60, for example, indicates that 60% of the asphalt was broken out by the admixture of the calcium chloride with the emulsion.

It has been recognized that emulsions of the quick breaking type should have a demulsibility in excess of 20. In some states, for example California, specifications for quick breaking emulsions to be used on state projects require a demulsibility of 60 minimum. In other states, for example Arizona, the minimum demulsibility is 40.

It has heretofore been proposed to produce quick breaking emulsions for use in road building by the penetration method by heating bituminous substances, such as asphalt, to a temperature above its melting point and then mixing the melted asphalt with an aqueous solution containing a relatively small amount of a caustic alkali. Emulsification of the asphalt proceeds by the saponification of the saponifiable materials, such as petroleum acids which are naturally present in the asphalt. Another method for producing quick breaking emulsions involves the use of a saponifiable organic acid in conjunction with the caustic alkali. In some instances, the saponifiable acid is added directly to the melted asphalt and this mixture is then emulsified by admixture with an aqueous alkaline solution. In other instances, the melted asphalt is mixed directly with the aqueous soap solution of the mixture of saponifiable acid and caustic alkali.

However, in order to produce satisfactory quick breaking emulsions employing soap or a mixture of the saponifiable fatty acid and caustic alkali as an emulsifying agent, it has been recognized that it is essential to employ a soap mixture of a saponifiable acid and caustic alkali in such proportions that the caustic alkali if used alone would emulsify the asphalt. For example, a formulation containing 0.3% by weight rosin oil and 0.2% sodium hydroxide, based on the finished emulsion, may result in the production of a satisfactory quick breaking emulsion with certain asphalts. However, the 0.2% of sodium hydroxide when used alone without the rosin oil will also produce a satisfactory quick breaking emulsion. In other words, the presence of rosin oil is unnecessary to produce the desired emulsion and an equally satisfactory emulsion may be produced without the rosin oil.

We have discovered that quick breaking emulsions may be produced by using an aqueous solution containing a mixture of a saponifiable acid and a caustic alkali as the emulsifying agent but in which the alkali content when used alone is incapable of producing the emulsion. The presence of the saponifiable acid, such as rosin oil, in conjunction with such amount of alkali results in the production of a satisfactory quick breaking emulsion. In other words, this invention distinguishes from prior practice in that an amount of alkali is employed in conjunction with the saponifiable acid which, if the alkali were used alone to produce the emulsion, an unsatisfactory emulsion would result but with the presence of the saponifiable acid, a satisfactory emulsion of the quick breaking type is produced. Whereas in the prior practice the amount of alkali used in conjunction with the saponifiable acid was effective when used alone to produce a satisfactory emulsion. In fact, in many instances it has been found that even the amount of alkali above stoichiometrical proportions to neutralize the saponifiable acid was unsatisfactory when used alone to produce a satisfactory quick breaking emulsion. For example, when employing a formulation containing 0.35% by weight of rosin oil and 0.35% by weight of caustic soda, a satisfactory quick breaking emulsion was produced, yet when employing 0.35% by weight of caustic soda alone to produce the emulsion, an unsatisfactory emulsion resulted. In this formulation only 0.025% caustic soda is required to neutralize the rosin oil, yet the remaining 0.325% representing the free caustic soda did not, when used alone, permit of the production of a satisfactory emulsion. In fact, the emulsions produced by using the above amounts of caustic soda, i. e., 0.325% and 0.35%, did not even result in the production of an oil-in-water type emulsion as these emulsions were of the inverted, i. e., water-in-oil type.

The reason for the above phenomena is not well known. Apparently when using 0.35% or 0.325% of caustic soda alone for emulsifying the asphalt, this amount is above the effective range of caustic soda necessary to produce a satisfactory quick breaking emulsion and results in the production of an inverted or water-in-oil emulsion which is not the desired type of emulsion. However, when using a saponifiable acid, such as rosin oil, in conjunction with the 0.35% of caustic alkali, a desired oil-in-water emulsion of the quick breaking type results.

In the above formulation, i. e., using 0.35% of caustic soda and 0.35% of rosin oil, the ratio of stoichiometrical equivalency of caustic soda to rosin oil is about 14 to 1, which means that there is present about fourteen times as much caustic soda as is necessary to neutralize the rosin oil. In the case of a neutral soap the ratio of stoichiometrical equivalency of caustic alkali to saponifiable acid is 1 to 1. It is within the scope of our invention to use formulations which produce quick breaking emulsions in which the ratio of stoichiometrical equivalency of caustic alkali to saponifiable acid is greater than 1 to 1 and is preferably, at least 2 to 1 and in which the caustic alkali content is ineffective when used alone to produce a satisfactory emulsion of the quick breaking type.

As a result of this discovery, we have been able to produce a superior emulsion to that which has heretofore been produced with the older methods employing either caustic alkali alone or a soap as the emulsifying agent. The emulsion produced according to our invention is characterized, not only by a high break but shows excellent resistance towards scumming during storage. In previous emulsions produced with caustic soda alone, for example, considerable difficulty has been experienced from scum forming on the surface of the emulsified asphalt in the storage tank which is due probably to surface breakdown because of contact with the air. Emulsified asphalts produced according to our invention have not exhibited this undesirable characteristic of coagulation on the surface of the emulsion and have thus obviated the necessity of frequent cleaning of the storage tanks and also the necessity of removing the broken particles of asphalt from the emulsion before employing them in paving construction which has been necessitated in order to prevent plugging of the nozzles used for spraying the emulsion on the aggregate.

It is, therefore, an object of our invention to produce quick breaking emulsions of high demulsibility, i. e., greater than 20 and preferably greater than 40. It is a further object of our invention to produce emulsions which remain stable in storage.

It is another object of our invention to produce quick breaking emulsions by employing soaps as emulsifying agents in which the alkaline content used to produce the soap is ineffective to produce a satisfactory emulsion of the quick breaking type and it is a further object of the invention to use as an emulsifying agent a mixture of a saponifiable acid and a caustic alkali in such proportions that the stoichiometrical equivalency of the caustic alkali to saponifiable acid is at least 2 to 1.

It is a specific object of the invention to emulsify asphalt to produce a quick breaking emulsion with the use of a mixture of caustic soda and rosin oil in such proportions that the caustic soda is ineffective when used in the absence of the rosin oil to produce a satisfactory quick breaking emulsion but in which the presence of the rosin oil results in the production of a satisfactory emulsion of the quick breaking type.

Other objects, features and advantages of our invention will become apparent to those skilled in the art from the following description of a specific example of our invention which is not to be taken as limiting the invention.

Approximately 57 parts by weight of an asphalt produced from Poso Creek residuum and having a penetration of approximately 200 at 77° F. (A. S. T. M. Method D5-25) was heated to approximately 300° F., after which the melted asphalt was passed through a mixing device comprising a centrifugal pump by means of which an aqueous solution containing approximately 0.35% by weight of sodium hydroxide and 0.35% by weight of rosin oil, based on the finished emulsion, was intimately mixed with the melted asphalt. Agitation at 160° F. to 180° F. by circulating the emulsion through a mixing device was continued until the asphalt was finally dispersed in the soap solution. The resulting emulsion contained approximately 57.3% asphalt, 42% water, 0.35% caustic soda and 0.35% rosin oil, all percentages by weight. A test on this emulsion showed that it had a demulsibility of 90.9 and that it would not scum when stored for at least ten days.

When the same emulsion was produced by the same method using 0.35% of caustic soda and no rosin oil, an unsatisfactory inverted emulsion resulted. The same was true when 0.325% caustic and no rosin oil was used to prepare the emulsion.

While the above example has been described using caustic soda as the caustic alkali and rosin oil as the saponifiable acid, it is obvious that other alkaline materials, such as potassium hydroxide or other alkalies, sodium or potassium carbonate or silicate or other alkaline salts may be used in place of the caustic soda and that other saponifiable materials, such as oleic acid, wood rosin, coconut oil, coconut oil fatty acids, naphthenic acids, etc., may be used in place of the rosin oil.

The quick breaking emulsions produced according to our invention may be converted into slow breaking emulsions, which permit the building of roads by premixing the emulsion with the aggregate. This may be accomplished by adding to the quick breaking emulsion a small amount, i. e., 1 to 2% of a stabilizing agent. As specific examples of the stabilizing agent which may be used to convert the quick breaking into a slow breaking emulsion, casein, glue, blood albumin, starch, gum acacia, agar-agar, algin and the like may be mentioned. In using certain of these stabilizing agents, as for example, casein or sodium caseinate, it is preferable to cool the quick breaking emulsion to a temperature below approximately 100° F. before adding the small amount of stabilizing agent, or rapidly cooling the emulsion after adding the stabilizing agent to below 100° F.

In some instances it is desirable to add to the stabilized emulsion a preservative for the stabilizer in order to prevent fermentation or other decomposition. Such preservatives include formaldehyde, cresol, phenol, sodium benzoate and the like.

The foregoing exemplary description of our invention is not to be considered as limiting since many variations may be made by those skilled in the art, without departing from the scope of the claims or the spirit thereof.

We claim:

1. A quick breaking bituminous emulsion of the oil-in-water type comprising a mixture of asphalt, water, saponifiable acid and caustic alkali, the ratio of stoichiometrical equivalency of the caustic alkali to saponifiable acid being approximately 14 to 1 and the amount of caustic alkali being ineffective in emulsifying said asphalt when used alone.

2. A method of producing a bituminous emulsion of the quick breaking type which comprises melting asphalt, commingling said melted asphalt with water a saponifiable acid and a caustic alkali, the ratio of stoichiometrical equivalency of said caustic alkali to saponifiable acid being approximately 14 to 1 and the amount of caustic alkali being ineffective in emulsifying said asphalt when used in the absence of said saponifiable acid.

3. A quick-breaking bituminous emulsion of the oil-in-water type comprising a mixture of asphalt and water and approximately 0.35% by weight of rosin oil and approximately 0.35% by weight of caustic soda, said amount of caustic soda being in excess of that necessary to neutralize all of said rosin oil and said excess caustic soda being ineffective alone to produce a satisfactory quick-breaking emulsion.

4. A method for producing a quick-breaking bituminous emulsion of the oil-in-water type which comprises melting asphalt, commingling said melted asphalt with a mixture of water and approximately 0.35% by weight of rosin oil and approximately 0.35% by weight of caustic soda, said amounts of rosin oil and caustic soda being based on the finished emulsion and said amount of caustic soda being in excess of that necessary to neutralize all of said rosin oil and said excess caustic soda being ineffective alone to produce a satisfactory quick-breaking emulsion.

ROSS J. GAROFALO.
FREDERICK S. SCOTT.